United States Patent
Metzler et al.

(10) Patent No.: US 12,475,567 B2
(45) Date of Patent: Nov. 18, 2025

(54) IMAGE-BASED METHOD OF DEFINING A SCANNING AREA

(71) Applicant: HEXAGON TECHNOLOGY CENTER GMBH, Heerbrugg (CH)

(72) Inventors: Bernhard Metzler, Dornbirn (AT); Matthias Saure, Aarau Rohr (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 229 days.

(21) Appl. No.: 18/199,852

(22) Filed: May 19, 2023

(65) Prior Publication Data

US 2023/0377163 A1 Nov. 23, 2023

(30) Foreign Application Priority Data

May 20, 2022 (EP) ..................................... 22174538

(51) Int. Cl.
*G06T 7/66* (2017.01)
*G06T 7/12* (2017.01)
(Continued)

(52) U.S. Cl.
CPC ................ *G06T 7/12* (2017.01); *G06T 7/174* (2017.01); *G06V 10/761* (2022.01);
(Continued)

(58) Field of Classification Search
CPC . G06T 7/12; G06T 7/174; G06T 2207/10024; G06T 2207/20092;
(Continued)

(56) References Cited

U.S. PATENT DOCUMENTS 6,400,831 B2 * 6/2002 Lee .......................... G06T 7/215
  348/169
6,420,698 B1 * 7/2002 Dimsdale ............. G01C 15/002
  250/234

(Continued)

FOREIGN PATENT DOCUMENTS

CN 113409332 A 9/2021

OTHER PUBLICATIONS

Lucieer, A., et al., "Texture-based landform segmentation of LiDAR imagery," International Journal of Applied Earth Observation and Geoinformation, vol. 6, Issue 3-4, pp. 261-270 (Mar. 1, 2005).
(Continued)

*Primary Examiner* — Philip P. Dang
(74) *Attorney, Agent, or Firm* — Maschoff Brennan (57) ABSTRACT

Image-based method of defining a scanning area with a measuring radiation-based measuring device such as a laser scanner, the method comprising roughly aligning a targeting axis of the measuring device towards an area of interest to be scanned, the area of interest having a coherent visual property, capturing with known orientation to the targeting axis an image covering the area of interest, displaying the image to a user, manually selecting by the user of at least one pixel of a group of pixels representing the area of interest in the image, automatically segmenting the group of pixels based on a similarity to the at least one selected pixel using a machine learning algorithm, and automatically defining the scanning area based on border pixels of the first group of pixels.

18 Claims, 3 Drawing Sheets

(51) Int. Cl.
*G06T 7/174* (2017.01)
*G06V 10/74* (2022.01)
*G06V 10/762* (2022.01)
*H04N 23/698* (2023.01)

(52) U.S. Cl.
CPC ............... *G06T 2207/10024* (2013.01); *G06T 2207/20092* (2013.01); *G06V 10/762* (2022.01); *H04N 23/698* (2023.01)

(58) Field of Classification Search
CPC ...... G06T 7/0002; G06T 7/10; G06T 2207/10008; G06T 2207/30252; G06V 10/761; G06V 10/762; G06V 10/25; G06V 10/44; G06V 10/82; G06V 10/26; G01S 17/42; G01S 17/86; G01S 17/89; G01B 11/002; G01C 1/04; G01C 5/00; G01C 11/025; G01C 11/04; G01C 15/002; H04N 23/698; G06N 20/00
See application file for complete search history.

(56) References Cited

U.S. PATENT DOCUMENTS

| | | | | |
|---|---|---|---|---|
| 7,940,974 | B2* | 5/2011 | Skinner | G06V 10/26 382/131 |
| 7,953,265 | B2* | 5/2011 | Sirohey | G06V 10/26 600/407 |
| 8,165,376 | B2* | 4/2012 | Shen | G06T 7/0012 382/129 |
| 9,355,474 | B2* | 5/2016 | Celi | G06T 7/10 |
| 9,373,181 | B2* | 6/2016 | Shen | G06T 19/00 |
| 11,158,062 | B2* | 10/2021 | Sandberg | G06T 7/38 |
| 11,361,476 | B2* | 6/2022 | Young | G06T 1/20 |
| 11,613,010 | B2* | 3/2023 | Cristache | G05D 1/0297 700/2 |
| 2007/0291994 | A1 | 12/2007 | Kelle et al. | |
| 2009/0080747 | A1* | 3/2009 | Lu | G06T 7/12 382/131 |
| 2010/0030515 | A1 | 2/2010 | Kludas et al. | |
| 2020/0167930 | A1 | 5/2020 | Wang et al. | |
| 2020/0320778 | A1 | 10/2020 | Duan et al. | |
| 2021/0145514 | A1* | 5/2021 | Grossman | A61B 90/50 |
| 2023/0039763 | A1* | 2/2023 | Khait | G06T 7/0002 |
| 2023/0377163 | A1* | 11/2023 | Metzler | G01S 17/86 |

OTHER PUBLICATIONS

Extended European Search Report dated Oct. 26, 2022 as received in Application No. 22174538.3.

* cited by examiner

IMAGE-BASED METHOD OF DEFINING A SCANNING AREA

BACKGROUND

The present disclosure relates to a method of defining a scanning area for scanning with an optoelectronic measuring device.

Optoelectronic measuring devices having scanning functionality, using which a position is determined based on optical radiation such as laser light, are known in manifold forms. Examples are geodetic measuring devices such as total stations and geodetic or metrological laser scanners such as the Leica P20 or Leica Multistation 50, laser trackers, or profilers, which are used to measure and/or produce 3D coordinates of surfaces, or laser scanners for geodetic or industrial measuring purposes. 3D scanning is a very effective technology for producing millions of spatial measurement points of objects within minutes or seconds. Typical metrological measuring tasks are the recording of objects such as ships, cars or aircraft or specific areas of interest thereof like gear wheels, wings or fins or objects such as industrial plants, house façades or historical buildings or details thereof, but also accident locations and crime scenes. For this purpose, they have to be capable of guiding the measuring beam of a distance measuring device over a surface and simultaneously acquiring direction and distance in relation to the measurement point. A so-called 3D point cloud is generated from the distance and the direction information correlated therewith for each point by means of data processing.

Such measuring devices have for this purpose at least one radiation source for generating optical measuring radiation, often laser radiation (wherefore such measuring is often generalized as laser scanning), and optical means such as lenses, prisms, mirrors, light-guiding fibers, or collimators, by means of which the generated measuring radiation can be emitted in free space onto a target to be measured, because of which these devices are also referred to as so-called free beam sensors. Optical measuring radiation is understood in this case as electromagnetic radiation, not only in the visible range of the spectrum, but rather also radiation in the ultraviolet, in the infrared, and in the terahertz range. Optoelectronic measuring devices are known which use measuring radiation having a wavelength of 405 nm, 532 nm, 635 nm, 650-690 nm, 780 nm or 785 nm, 795 nm, 808-850 nm, 905 nm, 980 nm, 1064 nm, or between 1500 and 1570 nm.

Furthermore, such a device has a beam deflection unit, by means of which the measuring radiation can be pivoted around at least one axis, usually two axes aligned perpendicularly to one another, for example, a vertical and horizontal axis. The beam deflector can be implemented in the form of a moving mirror or alternatively also by other elements suitable for the controlled angle deflection of optical radiation, for example, rotatable prisms, movable light guides, deformable optical components, a moving alidade and telescope, etc.

The target to be measured is, for example, a multitude of points of a surface of an object. The irradiated target reflects measuring radiation in a diffuse or oriented manner, so that at least a part of the measuring radiation is reflected back to the measuring device. The measuring device has an optoelectronic sensor, which is designed for at least time-resolved detection of the measuring radiation, for example, an APD diode, an SPAD array, or an array of SPAD arrays. The desired measured variable is determined on the basis of the detected measuring radiation. Various measuring principles are available for this purpose, for example, interferometry or a runtime measurement (time-of-flight, TOF), which determines the runtimes of individual laser pulses and therefrom from—with knowledge of the speed of light—the distance from the target object.

Measuring a point or area at least comprises determining a distance to said point or to one or more points in said area. In particular, it comprises determining three-dimensional (3D) coordinates of said point or of a plurality of points in said area in a reference coordinate system of the measuring device.

By scanning, a plurality of surface points of the target object or target area is sampled in succession by the pivoting, whereby, for example, an item of 3D information, particularly a 3D-point cloud about the object as a whole and/or of the scanning area is produced. The measurement is usually performed with determination of distance and angles, i.e., in spherical coordinates, which can also be transformed into Cartesian coordinates for display and further processing.

For rapid and accurate scanners, in particular a short measuring time is required with high measurement accuracy at the same time, for example, a distance accuracy in the millimeter range or less at measuring times of the individual points in the range of sub-microseconds to milliseconds. The spatial measuring resolution is of particular significance in this case. It determines which details can still be recognized, but also the duration of the scanning procedure and the quantity of data arising in this case. Measuring projects using modern high-speed scanners produce 3D point clouds having a strength of, for example, several hundred million or several billion object points and above.

In particular in case of such high accuracy scanning with accordingly longer scanning duration and high data volume, the latter leading to longer data transfer and processing times, it is desirable to limit the scanning area to mainly cover only the object or area of interest and reduce the unnecessary background as much as possible.

Today, in laser scanning the scanning area is defined by an operator by selecting a bounding box on an image captured from the surveying object. In many cases this rectangle only poorly represents the shape of the target area to be scanned and a lot of background points are scanned unintendedly.

Alternatively, instead of a rectangle for a more precise selection the user can define the area of interest by defining a polygon on the image. This, however, requires the manual selection of a lot of points representing the correct shape which takes some time and is cumbersome for the user.

SUMMARY

It is therefore an object of the present disclosure to provide an improved method for defining a scanning area for a laser-based measuring device.

Another object is to provide such a method that allows to narrowly define a scanning area regarding an area of interest.

Another object is to provide such a method, which is substantially automated.

At least one of these objects is achieved by the methods and devices described herein.

A first aspect of the present disclosure pertains to an image-based method of defining a scanning area based on an area of interest for geodetic surveying and/or for technical purposes such as metrological measurements by scanning with an optoelectronic radiation-based, preferably laser-based, measuring device, e.g. a laser tracker, scanning total station or laser scanner. Said (first) area of interest has a coherent visual property, for example an optical uniformity such as even color or a uniform pattern or texture. In any case, the area of interest is visually coherent and discernable from other parts of the environment.

The method comprises capturing a (first) image covering the area of interest with known orientation or spatial relation to a targeting axis of the measuring device and displayed to a user. The user manually selects or marks at least one pixel of a (first) group of pixels representing the (first) area of interest in the image by the user, e.g. by pointing on the displayed image.

Then, there is an automatic segmenting of the group of pixels based on a similarity to the at least one selected pixel using a machine learning algorithm, whereby the automatically selecting can be optionally initiated by or started instantaneously in response to the point selection/marking by the user. That is, the remaining or other pixels representing the area of interest are automatically selected or identified due to their similarity, to the manually selected pixel which is given by the visual coherence of the area of interest. Pixel similarity thereby preferably relates to color and/or texture resp. to color values, including color gradients, saturation and/or brightness.

The scanning area is automatically defined based on border or edge pixels of the segmented group of pixels. For example, image or pixel positions of border pixels are translated into (pairs of) vertical and horizontal outer angles for the targeting axis alignment, which is enabled by the known orientation of the image acquisition to the targeting axis.

As an option, the targeting axis is manually roughly aligned towards the first area of interest before capturing the first image. Alternatively or additionally, the first image is captured in course of an automatic, e.g. 360°, panorama imaging with the targeting axis being automatically aligned or oriented.

As a preferred option, said pixel similarity is determined using embedding vectors. For example, for each pixel of the image an embedding vector is computed, which are mapped into a n-dimensional embedding space. Then, there is a clustering or grouping of embedding vectors neighbored in the embedding space using a clustering algorithm and segmenting/selecting the similar group of pixels according to the cluster comprising the embedding vector of the marked pixel.

As another example, the automatic segmenting comprises computing for each pixel of the first image an embedding vector, continuously or successively comparing embedding vectors of neighboring pixels to an initial or center pixel, starting with the marked pixel, adding pixels to said group of pixels as long as/if the comparing of according embedding vectors reveals a difference below a defined threshold. The group of pixels can be completed when no embedding vector with a difference below the defined threshold is identified.

As an option, the scanning area is defined according to or including a buffer range or buffer zone which is extending a range given by the border/edge pixels of a group of pixels. That is, the scanning area is going more or less beyond the limits given by the group of pixels, in particular to make sure that no region of the area of interest is missed or to include regions which relate to the area of interest but are visually different, e.g. a frame.

As a further option, the buffer range is established by adding a band or range/zone of pixels around the group of pixels and/or by adding respective angle values or intervals to outer angles for the targeting axis alignment derived from the border pixels. Alternatively or additionally, the buffer range is dependent on a property of the group of pixels or subgroups thereof such as size, shape, position, saturation and/or brightness. That is, the buffer range can vary according to the image content.

As another option, there is a centering of the targeting axis before starting a scanning procedure to the defined scanning area based on a center or dimension of the selected group of pixels. Hence, if the targeting axis is not optimally aligned relative to the recognized area of interest, it can be automatically be aligned better before starting a scan. As another option, the border pixels of a group of pixels are defined using a geometric shape such as a polygon, fitted to the border of the group of pixels.

In a further development of the method and in case a second area of interest having a similar visual property as the first area of interest and spatially separated from the first area of interest is imaged in the first image, the method comprises automatically segmenting a second group of pixels representing the second area of interest based on the similarity to the at least one marked pixel using a machine learning algorithm and defining the scanning area or a further scanning area based on border pixels of the second group of pixels. Seen otherwise, an area of interest has not to be a closed or continuous one but can be split or distributed in separate parts throughout the image and is still automatically scanned completely by just marking one part of it, without having to manually mark all single pieces.

Quite similar, the principle can be applied not only to one image or more particularly one object or area of interest or stationing but to multiple ones. Hence, optionally, there is a storing of information relating to the first group of pixels, in particular at least an embedding vector of the manually selected pixel, capturing a second image with known orientation relation to the targeting axis of a further area of interest of similar visual property as the first area of interest, whereby the first and second image are for example captured from different locations. Then, there is a defining of a further or second scanning area based on the further image and the stored information without manually selecting of a pixel in the further image.

Hence, visually similar objects or area of interest can be automatically scanned in a targeted manner with only once having to mark a point in an image of one of them. For example, a series of work pieces can be automatically scanned, having only to make a user input at the first work piece. Or, a coherent region having to be scanned from multiple position due to its size, e.g. a wing, or geometry has only to be marked at the first position.

As still another option, the defining of the scanning area is according to a user's choice by manual input such that an area directly attached to and/or enclosed by the area of interest but of different visual property is either included or excluded in the scanning area. That is, it can be chosen to only scan the coherent area of interest as such or to include regions enclosed by it or directly in close neighborhood to it, too. Thereby, according to the user's choice, the defining can be based either (only) on outer border pixels, to exclude visually different regions, or on outer and inner border pixels to include them. If for example a wheel is to be scanned and the black tire is selected, then it can be chosen to exclude or include the silver rim.

In a second aspect, an optoelectronic radiation-based scanning measuring device, in particular metrological and/or geodetic measuring device, having a targeting axis, a camera with known orientation or spatial relation to the targeting axis and a control and evaluation unit.

The control and evaluation unit is configured to automatically segment, using a machine learning algorithm, a group of pixels within an image of an area of interest taken with the camera based on a similarity to an at least one pixel selected by a user within the image, to automatically define a scanning area, in particular by defining pairs of vertical and horizontal outer angles for the targeting axis alignment, based on border pixels of the first group of pixels and to automatically initiate or execute a measuring of the scanning area.

A third aspect pertains to a computer programme product comprising programme code which is stored on a machine-readable medium, or being embodied by an electromagnetic wave comprising a programme code segment, and having computer-executable instructions for performing, in particular when run on a computer unit of the measuring device according to the second aspect, the method according to the first aspect.

The present disclosure provides the advantage that an area of interest of coherent visual property can be scanned in a fine targeted or exactly selected manner with minimal effort for the user. In further developments this is even enabled if the area of interest is partitioned in multiple, spatially separated parts or more than one area of interest of the same visually or optically defined/recognizable type is present, e.g. the two wheels of a car on one side. Therewith, unnecessary scanning time and scanning data (time for and data of irrelevant areas) is automatically avoided, reducing also time for data transfer and processing.

In further developments, a specific automatic scan of similar areas of interest is enabled without having to mark such a similar area. For instance if all four wheels of a car are to be scanned, only one wheel on one side has to be marked by the user by pointing one imaged point of it. Not only the second wheel on the same side then is specifically scanned (without scanning the whole side of the car, only both wheels), but when going to the other two wheels on the other side, these further wheels are also automatically identified as areas of interest and specifically scanned without the need to point at them in an image, hence without any additional user input.

BRIEF DESCRIPTION OF THE DRAWINGS

Aspects will be described in detail by referring to exemplary embodiments that are accompanied by figures, in which.

DETAILED DESCRIPTION

Figure 1:
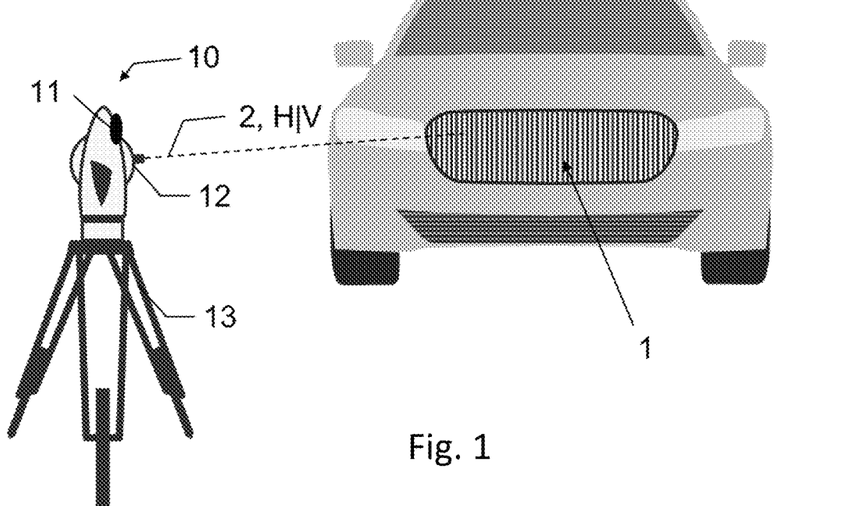
FIG. 1 illustrates a first exemplary laser-based measuring device.

FIG. 1 illustrates a first exemplary laser based terrestrial and/or stationary measuring device 10 for application of a method, for example a laser scanner, multi-station (total station with scanning functionality) or a laser tracker. The device 10 has for example an intensity-modulated, in particular pulsed radiation source (not shown), for example, a laser source, and an optical measuring unit 12 so that a pulsed measuring beam can be emitted into free space onto a target object O, in an emission or targeting direction 2, wherein the respective present direction (horizontal angle H, vertical angle V) of the emission or the targeting axis 2 is measured by one or more position/angle detectors (not shown). The optical unit is embodied, for example, as a combined emitting and receiving optical unit or has in each case a separate emitting optical unit and receiving optical unit. In this case, light pulses reflected from the target object O are received by the measuring device 10 and acquired by an optoelectronic detector (not shown). In this case, for example, up to a million or more light pulses per second and thus sampling points can be acquired.

For the scanning sampling of the object O, the measuring radiation or emission direction 2 is progressively pivoted and in each case at least one measured value per scanning point is successively recorded at short time intervals, among them in any case a distance value to the respective scanning point, so that a plurality of measurement directions associated with a respective scanning point is provided and form a scanning grid from a plurality of scanning points.

In addition to the distance measured value, optionally, for example, a brightness or intensity value is recorded. The brightness is a grayscale value, which is determined, for example, by integration of the bandpass-filtered and amplified measuring radiation over a measuring period associated with the object point.

The pivoting is performed in this case by means of a beam deflector, as shown, for example, by an upper part of the measuring device 10 being rotated step-by-step or continuously in relation to a base 13—relatively slowly—around a first, vertical axis, so that the measuring radiation is pivoted in the horizontal and the plurality of emission directions differ from one another in the horizontal alignment, and in that a pivotable optical component, for example, a pivoting or rotating mirror, is rotated—relatively rapidly—about a horizontal axis, so that the measuring radiation is pivoted in the vertical and the plurality of emission directions additionally differ from one another in the vertical alignment. The object surface is thus scanned line-by-line, for example, using a line grid. The scanning takes place in this case within a predetermined angle range, the boundaries of which are defined by a horizontal and vertical pivoting width.

In this case, not the whole object/car O is to be scanned, but only a specific (sub-) object or area of interest 1, here the radiator grill on the front of the car O. This area of interest 1 shows an even optical or visual property, in the example a uniform pattern or texture. Based on this visual coherence of the area of interest or area to be scanned, the scanning region or swiveling range of the target axis 2 is defined using an image of the object O as explained in the following figures.

The image thereby is taken by a camera 11 of the laser scanner 11 which is situated in known spatial relationship to the measuring unit 12. Hence, an image can be captured in defined orientation to the targeting axis 2. Thereby, the camera 11 can be manually aligned roughly towards the area of interest 1 by a user such that at least part of the area 1 is within the camera's field of view for capturing the image. As another example, a panorama image of the measurement surrounding comprising the area of interest 1 is captured, e.g. by 360°-rotation of the upper part of the measuring device 10 and therewith the camera 11 or using multiple cameras, e.g. four cameras, each covering a 90°-sector.

Figure 2A:
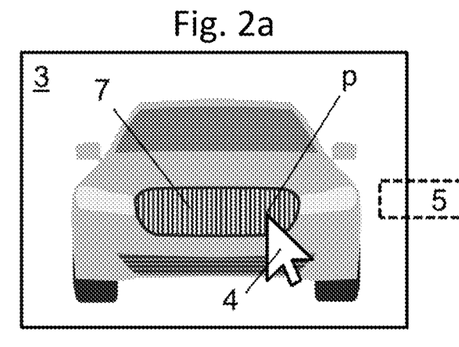
FIGS. 2a-d illustrate an example of defining a scanning area.

FIGS. 2a-2d show an example of defining a scanning area. In FIG. 2a, an image 3 is shown, the image 3 imaging the car, part of its surrounding and in particular the area of interest, the radiator grill. The area of interest is represented by a segment of the image 3 or said otherwise by a group of pixels 7. This image 3 is displayed to the user, e.g. on a display of the measuring device, or a connected remote control device such as a smartphone or computer connected by internet. More generally spoken, the processing can take place on the measuring device or a companion device, e.g. laptop or table, that is used to control the measuring device. Alternatively, the image 3 and any user input can be transmitted to a cloud and the selection of the area is processed on a cloud server.

As indicated in the figure by arrow 4, as user input only a selection or marking of a pixel p of the area of interest resp. the group of pixels 7 is needed. Hence, he/she clicks or points onto the pixel p on the radiator grill depiction. The underlying computer registers the selection and automatically initiates an automatic selection procedure 5 in response.

Figure 2B:
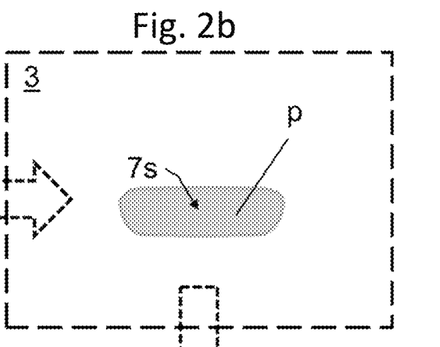

As depicted in FIG. 2b, an algorithm segments the area of the radiator grill in the image 3 (for better clarity, the rest of the image 3 is not depicted). That is, the group of pixels 7s (in the figure marked by the grey area), comprising the manually selected pixel p, is automatically identified or recognized by the automatic segmentation 5. The algorithm is selects pixels that are similar to the manually selected pixel p. In the example, all pixels 7s are selected which relate to the same optical pattern or texture (and therewith the patterned radiator grill), using a machine learning algorithm trained on pattern recognition. Thereby, properties such as brightness or saturation can be taken into account.

Figure 2C:
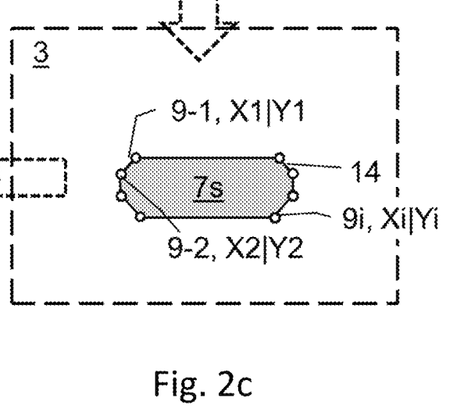

FIG. 2c depicts a next method step 6 wherein the border or edge of the segmented area 7s is transformed into a geometric shape, in the example a polygon 14 defined by—for example eight-points 9-1, 9-2, . . . , 9i with image coordinates (X1|Y1), (X2|Y2), . . . , (Xi|Yi). That is, a polygon line 14 is fitted around the group of pixels 7s. How complex the polygon 14 is resp. how many border points or pixels 9i are determined can be a predetermined or fixed value or depend for example on the size of the pixel group 7s. In the simplest form, the geometric shape fitted is a rectangle or a circle or ellipse.

Thereby, these image coordinates (Xi|Yi) can be "real" pixel positions or "artificial", computed image positions. For example, if the polygon 14 is embodied as a rectangle, the width and length of this rectangle is given by the pixels with the furthest distance to each other in "horizontal" and "vertical" direction. Then, as points 9i which define the scanning range, the corner points of the rectangle are used which can be only computed, "mathematical" points. The scanning area itself can also be defined by measures such as length and width or diameter of a fitted geometry 14 or without using a computed shape at all but for example directly based on pixel positions of some or all selected edge pixels.

Figure 2D:
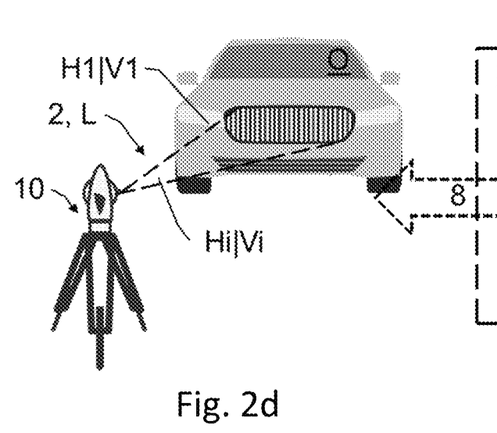

FIG. 2d shows the further step 8 wherein the border of the segmented pixel group 7s, in the example defined by polygon 14 resp. the therewith defined edge points 9i is used to derive a scanning area therefrom. As the image 3 is taken in well-defined positional relation to the targeting axis 2 of the laser scanner 10, a pixel or point coordinate (Xi|Yi) can be converted into a targeting direction, for example defined by horizontal and vertical angle values Hi, Vi. Accordingly, the laser scanner automatically starts emitting a laser beam L along the targeting axis 2 being directed to a first pair of angles Hi|Vi and scans the full area of interest by continuously swivelling the targeting axis 2 resp. laser beam L within the angle range given by the angles Hi|Vi to the last point of the scanning area given by the last angle derived from the last point 9i of the polygon 14. Said otherwise, these angles Hi|Vi are derived from border positions of the selected pixel area 7s or the point or pixel coordinates (Xi|Yi) are transformed into angles Hi|Vi that define the borders of the scanning area.

The automatically selected scan area can also be used to center the targeting axis 2 before starting the scanning to the area of interest. That is, for example a center, e.g. in form of a vertical center line, of the polygon 14 is computed and converted into one or more angle values, in particular a vertical angle. Then, the laser scanner's targeting unit is rotated (vertically) such that the targeting axis 2 in its center or "zero" position is pointing at the center of the area of interest. Therewith, if for example due to the only rough alignment of the laser scanner 10 to the area of interest, the area is situated in a border or outer part of the field of view of the measuring device 10, a position in the center of the field of view or at least a more central positioning can be automatically achieved before scanning. This may also be achieved by centering the targeting axis 2 to a corner point of the scanning area, e.g. point 9-1. Thereby, also a dimension or extent of the automatically determined area 7s can be taken into account for an automatic first or pre-scan alignment of the targeting axis 2. As an alternative to an automatic alignment of the targeting axis 2, a user may be guided to manually fine align or center the targeting axis 2, e.g. by indicating or highlighting the automatically determined scanning area on a display in relation to the actual field of view of the measuring device 10 and showing an instruction for manually changing the field of view resp. reposition or realign the device 10.

Figure 3:
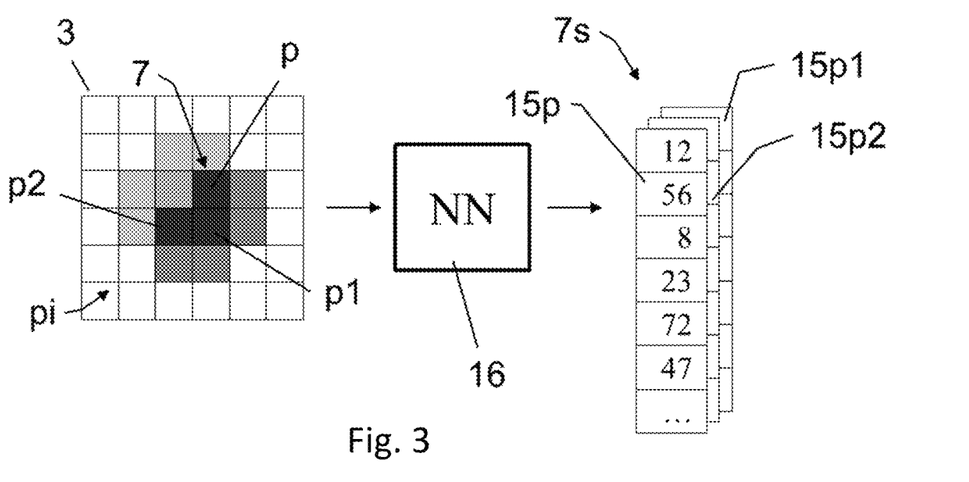
FIG. 3 shows an example for automatically segmentation of pixels based on embedding vectors.

FIG. 3 shows an example for automatically segmentation of pixels p, p1, p2 in an image 3. In the example, the segmentation algorithm that selects the pixels p, p1, p2 covering the imaged area of interest 7 (marked black) can be based on machine learning. In this case, a neural network (NN) 16 is applied that computes for each pixel pi a so called embedding vector (only the embedding vectors 15p, 15p1, 15p2 for the pixels p, p1, p2 of the area of interest 7 are depicted). Each vector 15p, 15p1, 15p2, . . . 15pi is an ordered list of for example about 16 or 32 values that describe the image content, in particular the color and texture, of the pixel p, p1, p2, . . . pi it refers to.

The selection of all pixels p, p1, p2 being part of the area of interest as imaged 7 can then be based on a clustering algorithm. In this case all embedding vectors 15p, 15p1, 15p2, . . . 15pi are mapped into the n-dimensional embedding space and similar vectors, such as vectors 15p, 15p1 and 15p2 grouped together. The group of pixels 7 are the result of the one group of vectors that contains the embedding vector 15p of the pixel p selected by the user.

Alternatively, this grouping can be done based on a region growing algorithm. Starting with the pixel p selected by the user, the embeddings 15p1, 15p2, . . . , 15p8 (the latter not depicted) of the eight neighboring pixels p1, p2, p8 are compared with the embedding of the selected pixel p and added to the group if the difference is smaller than a defined threshold. This comparison is then repeated with all newly added pixels and their neighbors until no further pixel pi is identified that fulfills the similarity criterion.

Figure 4A:
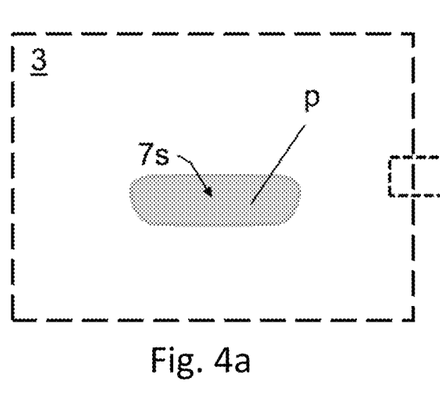
FIGS. 4a,b illustrate a further development of the method.
Figure 4B:
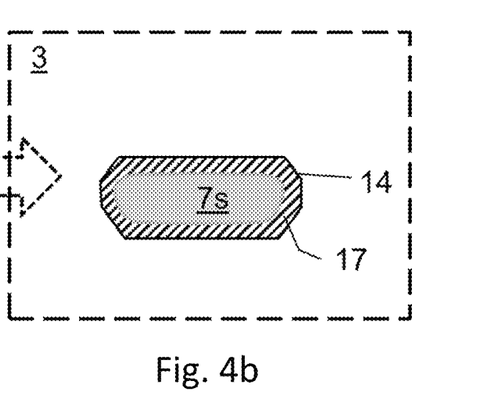

FIGS. 4a, 4b illustrate a further development of the method. FIG. 4a shows similar to FIG. 2b the image 3 wherein the group of pixels 7s originated on the manually selected pixel p has been selected. Based thereon, in a step 6', a polygon 14 is computed, as illustrated schematically in FIG. 3*d*.

In this example, different to the one of FIG. 2*c*, the polygon 14 is not closely fitted to the edge pixels of the group of pixels 7*s* but with a certain distance to them. Hence, polygon 14 encloses not only the group of pixels 7*s* but in addition a pixel region 17 around them. Then again, the scanning area is defined based on the polygon 14 and therewith a buffer range 17 for the scanning area. Accordingly, not only or strictly the area of interest is scanned but an additional enclosing zone around it. This measure prevents that parts of the area of interest which were not recognized as such by the segmentation algorithm e.g. due to bad lightning conditions are nevertheless included.

Such a buffer range 17 may also be defined not with the help of a polygon 14 but as an additional number or range of pixels directly added to the group of pixels 7*s*. As another option, a supplemental angle range may be added to scanning angles derived from the group of pixels 7*s* resp. polygon 14.

Also, the buffer range 17 may not surround the initial derived area of interest completely but only be added at certain regions. For instance, if a fluent transition of color or texture in a region of the image is recognized and therewith a high uncertainty in determination of similarity to the marked pixel p resp. a clear border of the group of pixels 7*s* is hard to establish, a buffer zone can be added specifically in this region.

As a further option, the extent of the buffer range can be dependent on an image property of the group of pixels 7*s* such as its position in the image 3 or its shape or image/pixel values such as saturation or brightness. For example, in case of low image quality, the buffer range may be larger than in case of high image quality. The buffer size may also depend on the size of the area of interest resp. group of pixels 7*s*, e.g. may be a proportion thereof or may be larger the smaller the size is (therewith, an indirect dependence on the distance to the area of interest may be taken into account as the imaged size depends thereon).

Such a buffer range 17 can also be depend on the image content. In the example of the radiator grill, the algorithm can be trained on the net or pattern in the inner of the grill but to include also a solid frame around the inner pattern if present. Thus, structures logically or structurally connected to the marked structure but of different optical or visual property are automatically also segmented though they are not represented by pixels similar to the one marked by the user.

Generally spoken, the scanning area might not be restricted to the visually coherent or similar area but automatically extended to an associated area. For example, if the façade of a building is to be scanned, the user selects a point of the wall. Then, the complete wall is segmented as being visually similar to the marked point but in addition, the scanning area can be automatically be configured to include not only the wall but also associated or enclosed structures or objects such as windows and doors.

In particular, the algorithm is configured such that the user can decide whether such an area of different visual property enclosed or attached to the one marked is to be added to the scanning area or not. That is for example, the user can make an input in advance such that windows or the like are either not included or included in the façade scanning.

Figure 5A:
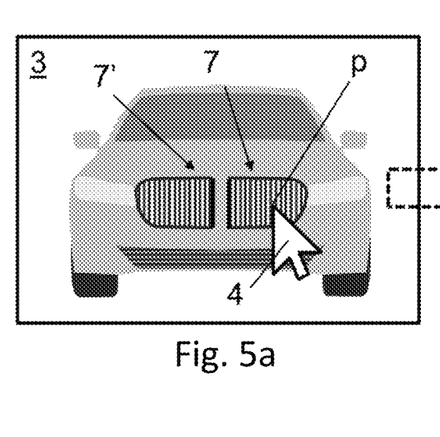
FIGS. 5a,b show another further development of the method, in particular for distributed or multiple areas of interest.
Figure 5B:
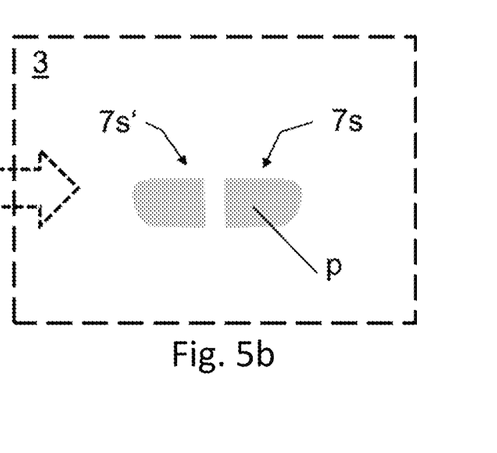

FIGS. 5*a* and 5*b* show another further development of the method. As illustrated in FIG. 5*a*, the radiator grill and therewith area to be scanned is not a single entity, but split into two parts. However, it still is sufficient that the user clicks on only one location in the image 3. He has not to mark pixels in both the first and second area of interest resp. group of pixels 7, 7' but only in the first area 7 or the second area 7'. That is, the approach is not limited to the selection of only one or only a continuous area of interest.

For, the segmentation algorithm 5' is implemented in such a way that all pixels in the image being similar to the marked pixel p are selected, wherever they might be located in the image 3. That is, not only pixels are selected that are directly or indirectly attached or connected to the selected pixel p but pixels that are separated from it, too. Accordingly, a first group of pixels 7*s* and a second group of pixels 7*s*' are segmented.

The algorithm might be further configured in such a way that positions of similar pixels (groups) are additionally considered. For example, that similar pixels are only recognized or considered as representing an area of interest if they are within a certain range or distance to the marked pixel p. Or, such pixels are only used for defining a scanning area if they in the same or similar pixel row or line as the first group of pixels 7*s* as is the case in the present example. For example in case of scanning of engines (blades) of an aeroplane, if two engines of the airplane are visible in the image and the user selects a point on the left engine, the algorithm can be configured to segment the pixels of the left and the right engine.

In any case, the scanning area might be defined strictly for each group of pixels 7*s*, 7*s*' or the space in between might be part of the scanning area, too. This in particular, if the space is below a certain maximum distance.

Figure 6A:
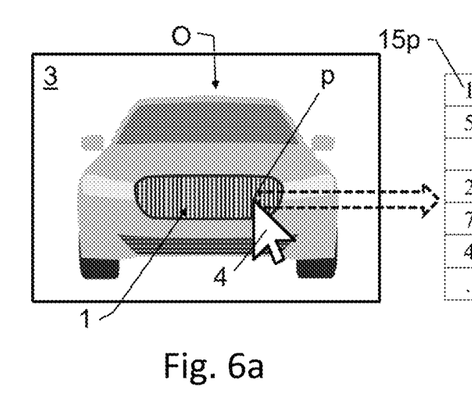
FIGS. 6a,b illustrate a further development wherein the automatic segmentation resp scanning area definition is applied to a second object.
Figure 6B:
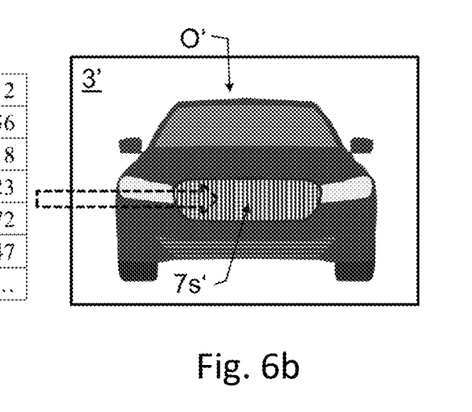

Such a "transfer" of pixel similarity is not restricted to be implemented within the same image 3 but can also be applied to another image of the same object or of another object resp. area of interest as described in context of following FIGS. 6*a,b*.

FIGS. 6*a,b* illustrate a further development wherein the automatic segmentation resp. scanning area definition is applied to a second object O' resp. second image 3'. As previously described, an embedding vector 15*p* for the pixel p manually selected (arrow 4) by a user is determined, relating to a first area of interest of a first object O. Based on this vector 15*p*, a first scanning area according to the first area of interest 1 is determined.

Now, the embedding vector 15*p* is not dismissed but stored and a second image 3' of a second similar object O' (here: a second similar car) captured, whereof a similar area of interest is to be scanned (again the radiator grill). The user needs not to make an input in particular needs not to manually select a point of the second image 3' but the information of the selected pixel p of the first image 3 is applied to the second image 3'. That is, for the pixels of the second image 3', embedding vectors are established and compared to the embedding vector 15*p* of the first image's pixel p. Embedding vectors of the second image 3' grouped together and similar to the reference vector 15*p* resp. the underlying pixels are selected and define a second scanning area for the second object O'.

Another exemplary workflow might be as follows: a laser tracker is set up and coarsely aligned with the object O. A first image 3 is captured and the user selects therein a pixel p inside the area of interest, e.g. the left engine of an airplane. Then, the scanning area is selected automatically by segmentation of the first image 3 and the scanning is performed. When the tracker is moved to another location, e.g. the other side of the airplane for scanning the right engine, the algorithm is applied to a second image 3' (of the same object O) captured at the new position without requiring a new input by the user. Therefore, for example all pixels of the second image 3' are converted into embeddings and compared with the embedding of the pixel p the user selected in the first image 3 and stored e.g. in a storage of the laser tracker.

This principle can be extended to a workflow where the user once selects (one or more pixel within) the area of interest within a first image 3 and then multiple times moves the measuring device to different locations. For each new location an image is captured and analysed and the scanning area detected. This workflow is advantageous in case the area of interest 1 cannot be scanned from a single position entirely, e.g. the fin of an airplane, but requires the re-location of the device to have a different perspective onto the object O. Hence, a definition of the area of interest 1 or a type of area of interest is only required to be done once and not again and again.

An embedding vector or any other characteristic of the underlying pixel used for such an multiple image analysis resp. multiple automatic scan area definition with multiple images can be stored only for a current or contiguous measurement task, or it can be stored permanently. In case of a permanent storage, then for a new, "fresh" measurement or re-measurement session of the same or a similar object resp. area of interest, a user might select from a menu the stored information, e.g. tagged "airplane engine", and then the measuring device automatically starts selecting and scanning any such airplane engine in its FOV.

Although aspects are illustrated above, partly with reference to some preferred embodiments, it must be understood that numerous modifications and combinations of different features of the embodiments can be made.

The invention claimed is:

1. An image-based method of defining a scanning area for, in particular metrological and/or geodetical, scanning with an optoelectronic radiation-based measuring device, the method comprising:
    capturing with known orientation to a targeting axis of the measuring device a first image covering a first area of interest, the first area of interest having a coherent visual property,
    displaying the first image to a user,
    manually selecting at least one pixel of a first group of pixels representing the first area of interest in the image by the user, in particular by pointing on the displayed first image,
    automatically segmenting the first group of pixels based on a similarity to the at least one selected pixel using a machine learning algorithm,
    automatically defining the scanning area, in particular by defining vertical and horizontal outer angles for the targeting axis alignment, based on border pixels of the first group of pixels.

2. The method according to claim 1, wherein manually roughly aligning the targeting axis towards the first area of interest before capturing the first image.

3. The method according to claim 2, wherein the first image is captured in course of an automatic, in particular 360°, panorama imaging with the targeting axis being automatically aligned.

4. The method according to claim 1, wherein the first image is captured in course of an automatic, in particular 360°, panorama imaging with the targeting axis being automatically aligned.

5. The method according to claim 1, wherein the coherent visual property and the pixel similarity relate to color and/or texture.

6. The method according to claim 1, wherein the pixel similarity relates to color value, saturation and/or brightness.

7. The method according to claim 1, wherein:
    computing for each pixel of the first image an embedding vector,
    mapping the embedding vectors into a n-dimensional embedding space,
    clustering of embedding vectors in the embedding space and
    segmenting said first group of pixels according to the cluster comprising the embedding vector of the selected pixel.

8. The method according to claim 1, wherein automatically segmenting comprises:
    computing for each pixel of the first image an embedding vector,
    successively comparing embedding vectors of neighboring pixels to an initial pixel, starting with the selected pixel, and
    adding pixels to said first group of pixels as long as the comparing of according embedding vectors reveals a difference below a defined threshold.

9. The method according to claim 1, wherein automatically centering the targeting axis before starting a scanning procedure to the defined scanning area based on a center and/or dimension of the first group of pixels.

10. The method according to claim 1, wherein the border pixels of the first group of pixels are defined using a geometric shape, in particular a polygon, fitted to the border of the first group of pixels.

11. The method according to claim 1, wherein the scanning area is defined including a buffer range which is extending a range given by the border pixels of the first group of pixels, whereby the buffer range is established by:
    adding a band of pixels around the first group of pixels and/or
    adding respective angle values to outer angles for the targeting axis alignment derived from the border pixels of the first group of pixels and/or
    the buffer range is dependent on a property of the first group of pixels or subgroups thereof, in particular size, shape, position, saturation and/or brightness.

12. The method according to claim 1, wherein in case a second area of interest having a similar visual property as the first area of interest is imaged in the first image, the method comprises:
    automatically segmenting a second group of pixels representing the second area of interest based on the similarity to the at least one selected pixel using a machine learning algorithm, and
    defining the scanning area or a further scanning area based on border pixels of the second group of pixels.

13. The method according to claim 1, wherein:
    storing information relating to the first group of pixels, in particular at least an embedding vector of the manually selected pixel,
    capturing a second image with known orientation relation to the targeting axis, in particular whereby the first and second image are captured from different locations, of a further area of interest of similar visual property as the first area of interest, defining a further scanning area based on the second image and the stored information without manually selecting of a pixel in the second image.

14. The method according to claim 1, wherein the defining of the scanning area is according to a user's choice by manual input such that an area directly attached to and/or enclosed by the first area of interest but of different visual property is either included or excluded in the scanning area, in particular wherefore according to the user's choice the defining is based either on outer border pixels or on outer and inner border pixels.

15. A computer program product comprising program code which is stored on a non-transitory machine-readable medium, and having computer-executable instructions for performing, when run on a computer unit of a scanning measuring device, the method according to claim 14.

16. A computer program product comprising program code which is stored on a non-transitory machine-readable medium, and having computer-executable instructions for performing, when run on a computer unit of a scanning measuring device, the method according to claim 1.

17. An optoelectronic radiation-based measuring device comprising:
   a targeting axis,
   a camera with known orientation to the targeting axis and
   a control and evaluation unit, the control and evaluation unit being configured to:
      automatically segment, using a machine learning algorithm, a group of pixels within an image of an area of interest of coherent visual property taken with the camera based on a similarity to an at least one pixel selected by a user within the image,
      automatically define a scanning area, in particular by defining pairs of vertical and horizontal outer angles for the targeting axis alignment, based on border pixels of the group of pixels, and
      automatically initiate a measuring of the scanning area.

18. A computer program product comprising program code which is stored on a non-transitory machine-readable medium, and having computer-executable instructions for performing a method when run on a computer unit of the scanning measuring device according to claim 17.

* * * * *